Patented Aug. 6, 1929.

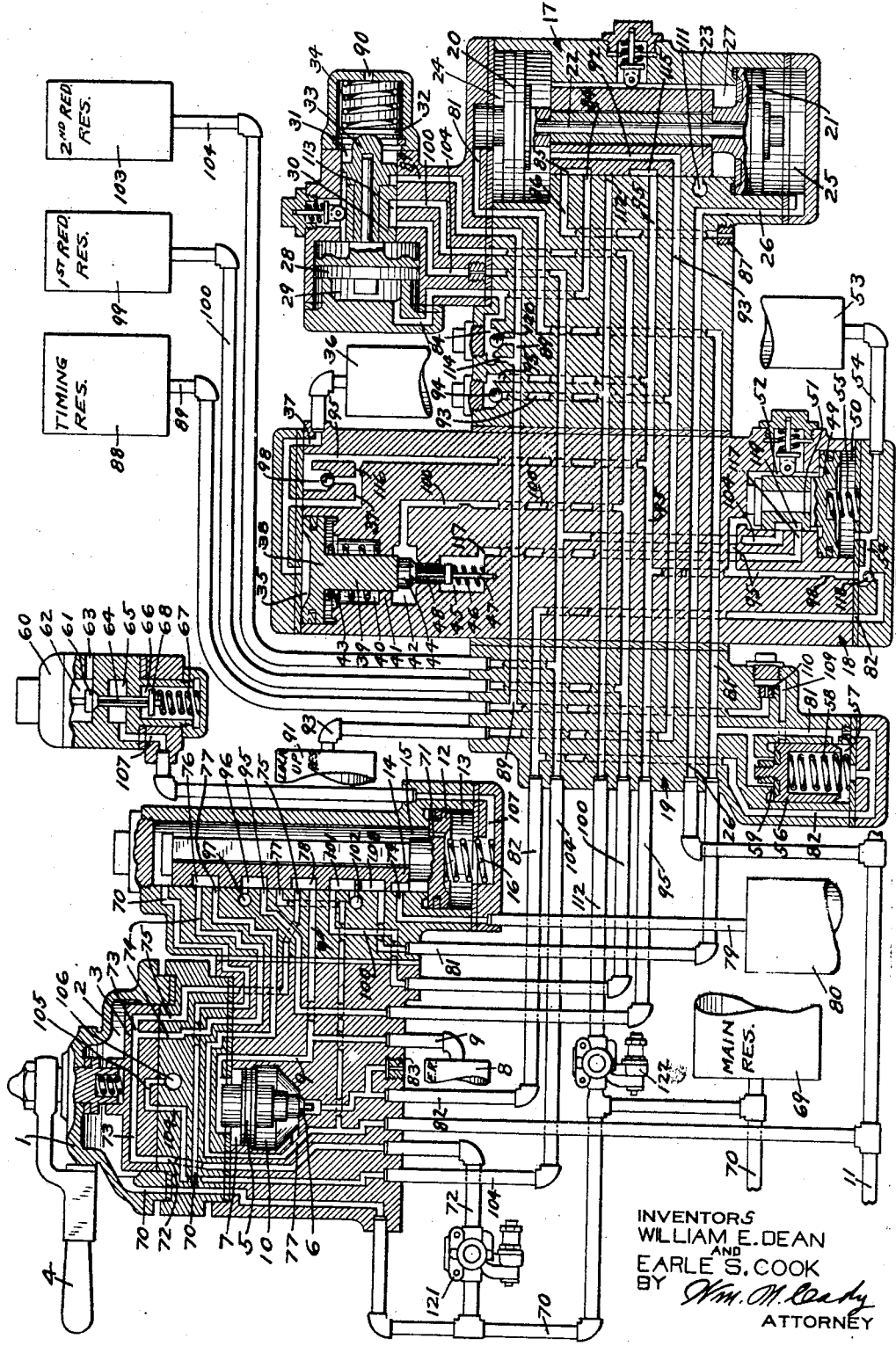

1,723,136

UNITED STATES PATENT OFFICE.

WILLIAM E. DEAN, OF EDGEWOOD, AND EARLE S. COOK, OF WILMERDING, PENNSYLVANIA, ASSIGNORS TO THE WESTINGHOUSE AIR BRAKE COMPANY, OF WILMERDING, PENNSYLVANIA, A CORPORATION OF PENNSYLVANIA.

SPEED-REDUCTION DEVICE.

Application filed May 10, 1928. Serial No. 276,571.

This invention relates to fluid pressure brakes and more particularly to a split or two stage reduction valve device for automatically effecting a reduction in brake pipe pressure in successive stages.

It has heretofore been proposed to provide means for automatically effecting a two stage reduction in brake pipe pressure by initially connecting a first reduction reservoir to the equalizing reservoir of the usual equalizing discharge valve mechanism for causing a first reduction in brake pipe pressure of such a degree as to cause the slack between the cars in a train to be gently gathered and then to connect a second reduction reservoir to the equalizing reservoir in order to cause a second reduction in brake pipe pressure, so as to apply the brakes with the desired force.

If the brake pipe is not air tight, leakage therefrom to the atmosphere increases the degree of the initial reduction in brake pipe pressure and also increases the rate at which said reduction is effected, so that in order to prevent harsh gathering of the train slack, the initial reduction in equalizing reservoir pressure has to be limited. However, if the brake pipe is substantially air tight, such a limited initial reduction in equalizing reservoir pressure is just sufficient to apply the brakes lightly, whereas under such a condition, the initial reduction could be increased to a degree such as to cause the same degree of brake application as in the case of severe leakage, and thus stop the train in substantially the same distance as in the case of brake pipe leakage.

One object of our invention is to provide an improved split or two stage reduction valve device having means for automatically varying the degree of the initial reduction in equalizing reservoir pressure inversely in proportion to the degree of brake pipe leakage, so as to accomplish the above described result.

After the initial reduction in brake pipe pressure is completed, it is necessary to wait a certain degree of time before effecting the second reduction in brake pipe pressure, in order to permit the slack between the cars to be completely gathered.

Another object of our invention is to provide an improved split or two stage reduction valve device of the type hereinbefore described and having means for automatically varying the time period between the end of the first reduction and the start of the second reduction in proportion to the train length, or in other words in proportion to the time required to gather the slack between the cars in a train.

Other objects and advantages will appear in the following more detailed description of our invention.

In the accompanying drawing, the single figure is a diagrammatic view of a fluid pressure brake equipment embodying our invention.

As shown in the drawing, the brake equipment comprises a brake valve device, a split or two stage reduction valve device, a magnet valve device and two feed valve devices.

The brake valve device is of the usual well known type comprising a casing 1 having a chamber 2 containing a rotary valve 3 adapted to be operated by a handle 4 and also containing the usual equalizing valve mechanism, which comprises an equalizing piston 5 and a discharge valve 6 operatively connected thereto. The piston 5 has at one side a chamber 7 connected to an equalizing reservoir 8 through a passage and pipe 9 and has at the opposite side a chamber 10 connected to the brake pipe 11 through a passage 77. Associated with the brake valve device is a brake application valve device comprising a piston 12 contained in a chamber 13 and a slide valve 14 contained in a chamber 15 and adapted to be operated by said piston. A spring 16 in piston chamber 13 tends to hold the piston 12 and slide valve 14 in their inner position, as shown in the drawing.

The split or two stage reduction valve device consists of three portions 17, 18, and 19, preferably associated with each other and having passages so disposed that either or both of the portions 18 and 19 may be removed and only the portion 17 or any combination of said portions including the portion 17 may be employed, as desired.

The portion 17 is substantially the same as disclosed in Patent No. 1,663,736, dated March 27, 1928, of Thomas H. Thomas and Earle S. Cook, and comprises two control pistons 20 and 21 of different diameters and connected together by a stem 22, and a slide valve 23 interposed between said pistons and adapted to be operated thereby. The larger piston 20 has a chamber 24 at its upper face, the smaller piston 21 has a chamber 25 at its lower face, which chamber is connected through passage 26 to the brake pipe 11, and between said pistons is formed a valve chamber 27.

The portion 17 further comprises a hold back piston 28 contained in a chamber 29 and a slide valve 30 contained in a chamber 31 and adapted to be operated by said piston. Also contained in chamber 31 is a thrust washer 32 held in engagement with the piston stem 33 by the pressure of a spring 34, which urges the piston 28 and slide valve 30 toward the outer position, as shown in the drawing.

According to our invention, the portion 18 of the split reduction valve device comprises a casing having a chamber 35 connected to a timing reservoir 36 through a passage and pipe 37 and containing a piston 38 having a depending stem 39 extending through a chamber 40 at the lower side of the piston and then loosely through a suitable opening in a partition wall 41 and into a chamber 42. A spring 43, acting on the piston 38 tends to hold it in the upper position, as shown in the drawing.

A valve 44 is contained in chamber 42 and has a fluted stem 48 extending through a partition wall and into a chamber 45, wherein a spring 46, acting on the head portion of a retainer stem 47, causes said head to engage the valve stem 48 and hold the valve in engagement with the depending piston stem 39, as shown in the drawing.

The portion 18 also comprises a piston 49 contained in a chamber 50 and a slide valve 51 contained in a chamber 52 and adapted to be operated by said piston. The piston chamber 50 is connected to a timing reservoir 53 through a pipe and passage 54 and contains a spring 55 acting on the piston 49 and tending to hold said piston in the position shown in the drawing.

The portion 19 of the split reduction valve device comprises a casing containing a valve piston 56 having at the lower side a chamber 57 containing a spring 58 urging said valve piston upwardly toward a seat ring 59 formed in the casing.

The magnet valve device comprises a magnet 60 and a valve 61 adapted to be controlled by said magnet. The valve 61 is contained in a chamber 62, which is connected to the atmosphere through a passage 63, and has a fluted stem 64 extending through a chamber 65, which is connected through passage and pipe 107 to the application piston chamber 13. The valve stem 64 terminates in chamber 66, wherein a spring 67 engages a thrust washer 68 in engagement with said valve stem and thereby tends to unseat the valve 61.

The magnet 60 is controlled according to the traffic conditions and when favorable is energized, which seats valve 61 and closes communication between the application piston chamber 13 and the atmosphere. When the traffic conditions are unfavorable, the magnet is deenergized, which permits spring 67 to unseat valve 61.

Fluid under pressure is supplied from a main reservoir 69 through a pipe and passage 70 to the application valve chamber 15 and from thence flows through a restricted port 7 in the application piston 12 to the piston chamber 13. With the magnet 60 energized, the fluid pressures on the opposite sides of the application piston 12 thus become equalized and spring 16 maintains said piston and the slide valve 14 in the release position, as shown in the drawing, in which position a passage 79 is uncovered by the slide valve 14, thereby permitting a reservoir 80 to become charged with fluid at main reservoir pressure by flow thereto from the application valve chamber 15.

Fluid at main reservoir pressure is also supplied through pipe and passage 70 to the rotary valve chamber 2 of the brake valve device and to the feed valve devices 121 and 122.

Fluid at the usual pressure employed in the brake pipe is supplied by the feed valve device 121 through pipe and passage 72 to the seat of the rotary valve 3. With the brake valve handle 4 turned to running position, as shown in the drawing, a cavity 73 in the rotary valve connects passage 72 to passages 74 and 75, so that fluid at feed valve pressure is permitted to flow from passage 72 through cavity 73, passage 74, cavity 76 in the application slide valve 14 when in the release position, as shown in the drawing, and from thence through passage 77 to the equalizing piston chamber 10 and to the brake pipe 11, thereby charging said brake pipe. Fluid at feed valve pressure also flows from cavity 73 in the rotary valve 3 to the equalizing piston chamber 7 and equalizing reservoir 8 by way of passage 75, cavity 78 in the application slide valve and passage and pipe 9. The fluid pressures then become equal on the opposite sides of the equalizing piston 5, and said piston maintains the discharge valve 6 seated, as shown in the drawing.

Normally, the valve piston 56 in portion 19 of the split reduction valve device, is maintained in the position shown in the drawing by spring 58, in which position the control piston chamber 24 is vented to the atmosphere through passage 81, chamber 57 at the lower side of valve piston 56, passage and pipe 82, and from thence through an atmospheric choke plug 83 in the brake valve device. The control piston chamber 25 being connected through passage 26 to the brake pipe 11, is charged with fluid at brake pipe pressure, which acts on the piston 21 and maintains said piston, the piston 20 and slide valve 23 in the upper position, as shown in the drawing. In this position of slide valve 23, the hold back valve piston chamber 29 is vented to the atmosphere through passage 84, cavity 85 in the control slide valve 23, passage 86 and the atmospheric choke 87, so that the pressure of spring 34 on the hold back valve piston stem 33 is permitted to maintain the piston 28 and slide valve 30 in the position shown in the drawing, in which a timing reservoir 88 is connected to the atmosphere through pipe and passage 89, hold back valve chamber 31 and passage 90 through the outer end wall of said chamber.

With the application slide valve 14 in release position, as shown in the drawing, the valve chamber 27, intermediate the control pistons 20 and 21, and a lock up reservoir 91, which is connected to said valve chamber through pipe and passage 93 and cavity 92 in the control slide valve 23, are both connected to the atmosphere by way of passage 93, past ball check valve 94, through passage and pipe 95, a cavity 96 in the application slide valve 14 and an atmospheric passage 97. The piston chamber 35, and reservoir 36 of the portion 18 of the split reduction device are connected to the vented passage 95 through passage 37 and past a ball check valve 98 and are therefore normally at atmospheric pressure, thereby permitting spring 43 to maintain the piston 38 in the upper position in which position spring 46 unseats valve 44. The piston chamber 50 and reservoir 53 of said portion are also normally at atmospheric pressure, since both are connected to the vented passage 95 through pipe and passage 54 and a choked passage 98. The valve chamber 52 is connected directly to passage 95, so that spring 55 is permitted to maintain the piston 49 and slide valve 51 in the position shown in the drawing. A first reduction reservoir 99 is normally connected to the atmosphere through pipe and passage 100, cavity 101 in the application slide valve 14 and the atmospheric passage 102, while a second reduction reservoir 103 is also normally connected to the atmosphere through pipe and passage 104, cavity 105 in the rotary valve 3 and the atmospheric port 106, when the brake valve is in the release position as shown in the drawing.

If the traffic conditions become unfavorable, the magnet 60 is deenergized and the pressure of spring 67 unseats the valve 61 and permits a rapid venting of the fluid under pressure from the application piston chamber 13 to the atmosphere through passage and pipe 107, chamber 65 and passage 63 in the magnet valve device. The pressure of the fluid in valve chamber 15 then shifts the application piston 12 and slide valve 14 downwardly against the pressure of spring 16 to application position, in which position, passages 74 and 75 are lapped, so as to cut off further flow of fluid at the reduced pressure supplied by the feed valve device 121, through said passages and passages 77 and 9 to the brake pipe 11, and the equalizing piston chamber 7 and equalizing reservoir 8 respectively. At the same time, the equalizing reservoir 8 and equalizing piston chamber 7 are connected to the first reduction reservoir 99 through passage 9, cavity 78 in the application slide valve and passage and pipe 100, thereby permitting the pressure in equalizing piston chamber 7 to reduce. The higher brake pipe pressure in the equalizing piston chamber 10 then shifts the equalizing piston 5 upwardly and unseats the brake pipe discharge valve 6, which permits fluid under pressure to flow from the brake pipe 11 through chamber 10 and into passage and pipe 82 and from thence to the atmosphere through a choke plug 83, thereby applying the brakes in the usual well known manner.

In application position of the application slide valve 14, cavity 108 connects passage 79 from reservoir 80 to passage 81, so that fluid at main reservoir pressure from the normally charged reservoir 80 is permitted to flow through passage and pipe 81 to the area inside the seat ring 59 at the upper face of the valve piston 56. When the application slide valve 14 initially moves to application position, the chamber 57 at the lower side of the valve piston 56 is at atmospheric pressure, so that the fluid under pressure supplied to the upper face of said valve piston shifts said valve piston downwardly against spring 58 and permits the fluid from passage 81 to flow through passage 109, choke plug 110 and passage and pipe 89 to the timing reservoir 88, thereby charging said reservoir at a slow rate.

Fluid under pressure also flows through passage 81 to the control piston chamber 24, wherein it acts on the piston 20 and shifts said piston, the piston 21 and slide valve 23 to their downward position, in which the valve chamber 27 is vented to the atmosphere through cavity 92 in the slide valve 23 and the atmospheric passage 111. Cavity 85 in said slide valve connects passage 84 to passage 112 from the feed valve device 122, so that fluid at a reduced pressure is permitted to flow from the feed valve device 122 through passage 84 to the hold back piston chamber 29, wherein said pressure acts on the piston 28 and shifts said piston and slide valve 30 to their inner position against the pressure of spring 34. In this position, the cavity 113 disconnects the passages 100 and 104 from the first and second reduction reservoirs 99 and 103 respectively, so as to prevent flow of fluid from the equalizing reservoir 8 and first reduction reservoir 99 through said cavity and passage 104 to the second reduction reservoir 103 during the initial portion of the brake application. Fluid at the reduced pressure supplied by the feed valve device 122 also flows from passage 84 through a choked opening 114 into passage 89 and from thence to the timing reservoir 88, thereby increasing the rate of charging the timing reservoir 88 over that through the choke plug 110, hereinbefore described.

When the application slide valve 14 moves to application position, cavity 96 connects the brake pipe passage 77 to passage 95 so that fluid at brake pipe pressure is permitted to flow through passage and pipe 95, cavity 115 in the control slide valve 23 and passage and pipe 93 to the lock up reservoir 91, thereby charging said reservoir. Fluid under pressure also flows from passage 95 through a choked opening 116 and passage 37 into piston chamber 35 and the reservoir 36, charging same at a restricted rate. Furthermore, fluid under pressure flows from passage 95 into slide valve chamber 52, wherein a pressure quickly builds up and forces piston 49 and slide valve 51 to their downward position, in which passage 104 from the second reduction reservoir is disconnected from passage 117 leading to valve chamber 45 and from thence past the unseated valve 44 and to the first reduction reservoir passage 100. At the same time as the valve chamber 52 is charged, fluid under pressure flows through the choked passage 98 and passage 54 to the piston chamber 50 and reservoir 53, wherein a pressure builds up at substantially the same or at a slightly slower rate than the piston chamber 35 and reservoir 36 are charged.

If the brake pipe 11 is substantially air tight, the equalizing piston 5 opens the brake pipe discharge valve 6 immediately following the downward movement of the application piston 12 and slide valve 14, and since the flow area of the atmospheric choke plug 83 is less than that past the discharge valve 6, a pressure builds up in passage and pipe 82 substantially equal to the brake pipe pressure. Fluid at said pressure then flows through passage and pipe 82 to valve piston chamber 57 in portion 19 of the split reduction valve device, and in said chamber acts upwardly on the valve piston 56. The opposing fluid pressures on said valve piston thereby become substantially equal and spring 58 shifts said valve piston to its upper position against seat ring 59, in which position passage 81 is connected to chamber 57, thereby permitting fluid discharged from the brake pipe 11 to flow from passage 82 through passage 81 to the control piston chamber 24, so as to maintain the control pistons 20 and 21 and slide valve 23 in their downward position. The upward movement of valve piston 56 cuts off communication between passages 81 and 109, so that further charging of the timing reservoir 88 takes place only through the choked passage 114 in the portion 17 of the split reduction valve device.

Fluid under pressure discharged from the brake pipe 11 into passage 82 also flows past a ball check valve 118 in portion 18 of the split reduction valve device and from thence into piston chamber 50 and reservoir 53, thereby quickly charging said chamber and reservoir. In the case of a substantially air tight brake pipe, the fluid discharged from the brake pipe builds up a pressure in piston chamber 50 immediately following the pressure build up in the valve chamber 52, so that even when the piston 49 and slide valve 51 are shifted downwardly upon the initiation of the brake application, they are immediately shifted back to their upper position by the spring 55, due to the balancing of fluid pressures on the opposite sides of the piston 49. With the slide valve 51 in the upper or inner position, passage 104 from the second reduction reservoir 103 is connected through cavity 119 to passage 117 and from thence through chamber 45 and past the unseated valve 44 to passage 100 leading to the first reduction reservoir. Consequently, with a substantially air tight brake pipe, fluid under pressure supplied from the equalizing reservoir to passage 100, as hereinbefore described, flows to both the first and second reduction reservoirs 99 and 103, respectively.

After a certain predetermined time from the downward movement of the application piston 12 and slide valve 14, the piston chamber 35 and reservoir 36 of the split reduction valve device become charged to a pressure, which forces the piston 38 downwardly, thereby seating valve 44 and cutting off further flow of fluid from the equalizing reservoir to the second reduction reservoir through passages 117 and 104. Then the fluid pressures equalize in the equalizing reservoir 8 and first reduction reservoir 99 only.

When the brake pipe pressure in equalizing piston chamber 10 is reduced a degree substantially equal to or slightly exceeding the reduced equalizing reservoir pressure in equalizing piston chamber 7, the equalizing piston 5 operates in the usual manner to seat the discharge valve 6 and prevent further flow of fluid under pressure from the brake pipe to the atmosphere.

After the brake pipe discharge valve 6 seats, the fluid under pressure in the control piston chamber 24 is vented to the atmosphere through passage 81, valve piston chamber 57, passage and pipe 82 and choke plug 83. Then the brake pipe pressure in control piston chamber 25 shifts the control pistons and slide valve 23 to the upper position, in which cavity 92 in the slide valve 23 registers with passage 93 from the lock-up reservoir 91, so that fluid under pressure is permitted to flow therefrom to the valve chamber 27. Since the control piston 20 is of greater area than control piston 21, the difference in the total force acting on said pistons is in an upwardly direction and thereby forcibly maintains said pistons and the slide valve 23 in the upper position.

With the control slide valve 23 in the upper position, fluid under pressure is permitted to flow from the hold back piston chamber 29 and timing reservoir 88, which is connected to said chamber through passage and pipe 89, past the ball check valve 120 and through passage 84, to the atmosphere through passage 84, cavity 85 in the control slide valve 23, passage 86 and the atmospheric choke plug 87.

After the pressure in the hold back piston chamber 29 is thus reduced a predetermined degree, spring 34 acting on the hold back piston stem 33 shifts the hold back piston and slide valve 30 to the outer position as shown in the drawing, in which position cavity 113 in the slide valve 30 connects passages 100 and 104 from the first and second reduction reservoirs respectively. Fluid under pressure from the equalizing reservoir 8 and first reduction reservoir 99 then flows to the second reduction reservoir 103 and permits a further reduction in pressure in the equalizing piston chamber 7, which in turn causes the equalizing piston 5 to again operate and open the brake pipe discharge valve 6 in order to effect a second stage of reduction in brake pipe pressure.

During the second stage of brake pipe reduction, the fluid under pressure vented from the brake pipe 11 into passage and pipe 82 flows to the control piston chamber 24, but does not shift the control pistons and slide valve downwardly, as during the initial stage of reduction, due to the counteracting pressure of the fluid in valve chamber 27.

If it is desired to limit the total degree of reduction in brake pipe pressure, the brake valve handle 4 is turned to lap position, in which position passage 104 from the second reduction reservoir is lapped by the rotary valve 3 in the brake valve device, so that the pressure of the fluid in the equalizing reservoir is permitted to reduce to equalization with the first and second reduction reservoirs and consequently permits a corresponding decrease in brake pipe pressure.

It will be noted that the degree of initial reduction under the substantially air tight brake pipe conditions, as hereinbefore described, is governed by first connecting both the first and second reduction reservoirs to the equalizing reservoir and then after a certain elapse of time cutting off the second reduction reservoir and permitting the pressures in the equalizing reservoir and first reduction reservoir to equalize.

Leakage of fluid under pressure to the atmosphere increases the rate at which a brake pipe reduction starts and in case such leakage is severe, the initial rate of brake pipe reduction is faster than the predetermined rate of reduction in equalizing reservoir pressure. Consequently, with severe leakage, the equalizing piston 5 does not open the discharge valve 6 for a considerable period of time after the downward movement of the application slide valve 14, with the result that the valve piston 56 is held in its downward position for a longer period of time by the fluid under pressure from reservoir 80. This permits fluid under pressure to flow from said reservoir through the choke plug 110 to the timing reservoir 88 for a longer period of time than in the case of an air tight brake pipe, as hereinbefore described. The control portion of the split reduction valve device is operated by the fluid from reservoir 80 in the same manner as hereinbefore described, so that the timing reservoir is also charged through the choked passage 114. However, the final pressure obtained in the timing reservoir even by charging through the choke plug 110 for a longer period of time, is substantially the same for a long train with severe brake pipe leakage as with light brake pipe leakage, so that the time of blow down of timing reservoir pressure and the resultant time period between the start of the first reduction and the start of the second reduction is substantially the same under both leakage conditions. This is true because on a long train, the final pressure obtained in the timing reservoir is substantially equal to the supply pressure and in the case of charging through two chokes, the initial rate of pressure build up is more rapid than through the single choke, but the final rate of build up is at a slower rate, whereas through the one choke the rate of build up is more uniform and produces substantially the same final pressure.

As hereinbefore described, when the application slide valve 14 moves to application position, fluid under pressure is supplied from the brake pipe 11 to slide valve chamber 52 in portion 18 of the split reduction valve device and quickly shifts the piston 49 and slide valve 52 downwardly and disconnects the first reduction reservoir passage 104 from passage 117 leading to the second reduction reservoir by way of the unseated valve 44. In case of severe brake pipe leakage, the piston chamber 35 and reservoir 36 become charged to a pressure sufficient to shift the piston 38 downwardly and seat valve 44 before the equalizing piston 5 opens the brake pipe discharge valve 6 and permits fluid under pressure to flow to piston chamber 50 and reservoir 53 and shift the piston 49 and slide valve 51 back to their upper position, so as to again connect the passages 104 and 117. As a result, the degree of the first reduction in equalizing reservoir pressure under severe brake pipe leakage conditions is limited to equalization into the first reduction reservoir.

The time from the movement of the application slide valve 14 to application position, to the opening of the brake pipe discharge valve 6 and the consequent upward movement of piston 49 and slide valve 51, increases with an increase in the degree of brake pipe leakage. The valve 44 is seated a predetermined time after the initiation of the brake application, so that the time between the upward movement of the piston 49 and slide valve 51 to the position shown in the drawing and the closing of valve 44 decreases in proportion to the increase in brake pipe leakage and consequently shortens the time that the second reduction reservoir 103 is connected to the first reduction reservoir 99. This results in the degree of initial reduction in equalizing reservoir pressure varying from a predetermined maximum amount in the case of a substantially air tight brake pipe to a minimum amount in the case of severe brake pipe leakage.

As the length of a train is decreased, the effect of leakage upon the brake pipe pressure maintained decreases rapidly, so that in effecting an application of the brakes on a short train having heavy brake pipe leakage, this split reduction valve device operates in the same manner as in the case of a lighter degree of leakage on a longer train and as the degree of said leakage decreases, the degree of initial application is automatically increased in the same manner as if the train were long.

Since the effect of leakage upon the brake pipe pressure decreases rapidly as the train length is decreased, then in applying the brakes on a short train having severe brake pipe leakage, the brake pipe discharge valve 6 opens quicker after the initiation of the brake application than on a long train having the same degree of leakage. As a result, the valve piston 56 is shifted to its upper position and laps passage 109, so that the timing reservoir 88 is charged through the choke plug 114 a proportionately longer time than through the two chokes 110 and 114, as on a long train. This results in a pressure being obtained in the timing reservoir proportionate to both the train length and the brake pipe leakage. The blow down of this variable degree of timing reservoir pressure, after the discharge valve 6 closes, then permits the second reduction in equalizing reservoir pressure to be started at the desired time.

Hereinbefore, only the effect of brake pipe leakage upon making a brake application has been described, however, a similar effect occurs in case a brake application is initiated in a train having an air tight brake pipe, if at the time the application is started, the brake pipe is being charged or recharged with fluid under pressure. This is true because the resistance to flow of fluid under pressure through the brake pipe causes the pressure to be built up to a higher degree at the front end of the train than at the rear end of the train. This split reduction device, however, will operate the same under such a condition as if the same difference in brake pipe pressure at the two ends of the train was caused by leakage, as hereinbefore described.

While one illustrative embodiment of the invention has been described in detail, it is not our intention to limit its scope to that embodiment or otherwise than by the terms of the appended claims.

Having now described our invention, what we claim as new, and desire to secure by Letters Patent, is:—

1. The combination with a brake pipe, of means for automatically effecting a reduction in brake pipe pressure in two stages and means for varying the amount the brake pipe pressure is reduced in the first reduction in brake pipe pressure in an inverse ratio to the amount of leakage from the brake pipe.

2. The combination with a brake pipe, of means for automatically effecting a reduction in brake pipe pressure in two stages and means for varying the amount the brake pipe pressure is reduced in the first reduction in brake pipe pressure according to the degree of leakage from the brake pipe.

3. The combination with a brake pipe, of means for automatically effecting a reduction in brake pipe pressure in two stages comprising an equalizing reservoir, means operated upon a reduction in pressure in the equalizing reservoir for effecting a reduction in brake pipe pressure, two reduction reservoirs, and means operable in effecting the first reduction in brake pipe pressure for first venting fluid from the equalizing reservoir to both reduction reservoirs and then to one of said reduction reservoirs.

4. The combination with a brake pipe, of means for automatically effecting a reduction in brake pipe pressure in two stages comprising an equalizing reservoir, means operated upon a reduction in pressure in the equalizing reservoir for effecting a reduction in brake pipe pressure, two reduction reservoirs, and means operated by fluid vented from the brake pipe in effecting the first reduction in brake pipe pressure for first venting fluid from the equalizing reservoir to both reduction reservoirs and then to one of said reduction reservoirs.

5. The method of effecting a reduction in brake pipe pressure which consists in first making a first reduction in brake pipe pressure varying in amount inversely as leakage from the brake pipe varies and in then making a second reduction in brake pipe pressure.

6. The method of venting fluid under pressure from an equalizing reservoir which consists in first venting fluid under pressure from the equalizing reservoir to a large volume and then to a smaller volume and finally after a predetermined time to the large volume.

7. The combination with a brake pipe, of an equalizing reservoir, means operated upon a reduction in pressure in the equalizing reservoir for venting fluid from the brake pipe, a first reduction reservoir, a second reduction reservoir, means for controlling the venting of fluid under pressure from the equalizing reservoir to said reduction reservoirs, and means operated by fluid under pressure supplied from the brake pipe for closing communication from the first to the second reduction reservoir.

8. The combination with a brake pipe, of an equalizing reservoir, means operated upon a reduction in pressure in the equalizing reservoir for venting fluid from the brake pipe, a first reduction reservoir, a second reduction reservoir, means for controlling the venting of fluid under pressure from the equalizing reservoir to said reduction reservoirs, and a valve device subject on one side to brake pipe pressure and operated by fluid discharged from the brake pipe in effecting a reduction in brake pipe pressure for opening communication from one reduction reservoir to the other reduction reservoir.

9. The combination with a brake pipe, of an equalizing reservoir, means operated upon a reduction in pressure in the equalizing reservoir for venting fluid from the brake pipe, a first reduction reservoir, a second reduction reservoir, means for controlling the venting of fluid under pressure from the equalizing reservoir to said reduction reservoirs, a valve for controlling communication from one reduction reservoir to the other reduction reservoir, and a piston for operating said valve, subject on one side to brake pipe pressure and on the other side to fluid discharged from the brake pipe in effecting a reduction in brake pipe pressure.

10. The combination with a brake pipe, of an equalizing reservoir, means operated upon a reduction in pressure in the equalizing reservoir for venting fluid from the brake pipe, a first reduction reservoir, a second reduction reservoir, means for controlling the venting of fluid under pressure from the equalizing reservoir to said reduction reservoirs, a valve device controlled by fluid under pressure supplied from the brake pipe for controlling communication from one reduction reservoir to the other reduction reservoir, and a valve device subject to the opposing pressures of the brake pipe and the pressure of fluid discharged from the brake pipe in effecting a reduction in brake pipe pressure for also controlling communication from one reduction reservoir to the other reduction reservoir.

11. The combination with a brake pipe, of an equalizing reservoir, means operated upon a reduction in fluid pressure in the equalizing reservoir for effecting a reduction in brake pipe pressure, a first reduction reservoir, a second reduction reservoir, means for controlling communication from the equalizing reservoir to said reduction reservoirs, a valve device operable while the first reduction in brake pipe pressure is being effected for controlling communication from one reduction reservoir to the other reduction reservoir, and means operating to connect one reduction reservoir to the other reduction reservoir to effect the second reduction in brake pipe pressure.

12. The combination with a brake pipe, of an equalizing reservoir, means operated upon a reduction in fluid pressure in the equalizing reservoir for effecting a reduction in brake pipe pressure, a first reduction reservoir, a second reduction reservoir, means for controlling communication from the equalizing reservoir to said reduction reservoirs, a timing reservoir, a valve device operated upon a predetermined increase in pressure in said timing reservoir for cutting off communication from one reduction reservoir to the other reduction reservoir, a second timing reservoir, and a valve device operated upon a predetermined increase in pressure in said second timing reservoir for opening communication from one reduction reservoir to the other reduction reservoir.

13. The combination with a brake pipe, of an equalizing reservoir, means operated upon a reduction in fluid pressure in the equalizing reservoir for effecting a reduction in brake pipe pressure, a first reduction reservoir, a second reduction reservoir, means for controlling communication from the equalizing reservoir to said reduction reservoirs, a timing reservoir, a valve device operated by fluid discharged from the brake pipe to said timing reservoir in effecting a reduction in brake pipe pressure for opening communication from one reduction reservoir to the other reduction reservoir, a second timing reservoir, and a valve device operated by fluid pressure supplied from the brake pipe to said second timing reservoir for closing communication from one reduction reservoir to the other reduction reservoir.

14. The combination with a brake pipe, of an equalizing reservoir, means operated upon a reduction in fluid pressure in the equalizing reservoir for effecting a reduction in brake pipe pressure, a first reduction reservoir, a second reduction reservoir, means for controlling communication from the equalizing reservoir to said reduction reservoirs, a timing reservoir, a valve device operated by fluid discharged from the brake pipe to said timing reservoir in effecting a reduction in brake pipe pressure for opening communication from one reduction reservoir to the other reduction reservoir, a second timing reservoir, a valve device operated by fluid pressure supplied from the brake pipe to said second timing reservoir for closing communication from one reduction reservoir to the other reduction reservoir, a third timing reservoir, and a valve device operated by fluid under pressure supplied to the third timing reservoir for opening communication from one reduction reservoir to the other reduction reservoir.

15. The method of venting fluid from the equalizing reservoir of a fluid pressure brake system so as to effect a reduction in brake pipe pressure which consists in first venting fluid from the equalizing reservoir to two reduction reservoirs and then to one of said reservoirs while effecting a first reduction in brake pipe pressure and then from the equalizing reservoir to both reduction reservoirs to effect a second reduction in brake pipe pressure.

In testimony whereof we have hereunto set our hands, this 7th day of May, 1928.

WILLIAM E. DEAN.
EARLE S. COOK.